United States Patent [19]

Altman

[11] Patent Number: 4,847,853
[45] Date of Patent: Jul. 11, 1989

[54] $CO_2$ TEA LASER HAVING ISOLATED PREIONIZATION COMPARTMENTS

[75] Inventor: Michael P. Altman, Washington Mills, N.Y.

[73] Assignee: United Technologies Corporation, Hartford, Conn.

[21] Appl. No.: 272,726

[22] Filed: Nov. 17, 1988

[51] Int. Cl.[4] .......................................... H01S 3//097
[52] U.S. Cl. ...................................... 372/86; 372/55; 372/83
[58] Field of Search ...................... 372/86, 83, 55, 33, 372/87

[56] References Cited

U.S. PATENT DOCUMENTS

| | | | |
|---|---|---|---|
| 3,934,212 | 1/1976 | Javan et al. | 372/60 |
| 4,077,017 | 2/1978 | Gilson et al. | 372/86 |
| 4,147,995 | 4/1979 | Leiby, Jr. | 372/86 |
| 4,380,079 | 4/1983 | Cohn et al. | 372/87 |
| 4,542,529 | 9/1985 | Pace et al. | 372/86 |
| 4,554,667 | 11/1985 | Kaminski | 372/83 |
| 4,555,787 | 11/1985 | Cohn et al. | 372/86 |
| 4,592,065 | 5/1986 | de Witte | 372/83 |
| 4,606,035 | 8/1986 | Hishi et al. | 372/87 |
| 4,613,971 | 9/1986 | Brumme et al. | 372/87 |
| 4,637,031 | 1/1987 | Gurs et al. | 372/86 |
| 4,802,185 | 1/1989 | Kyusho | 372/86 |

FOREIGN PATENT DOCUMENTS 2046984 11/1980 United Kingdom .

OTHER PUBLICATIONS

"A Sealed, UN-Pre-Ionization $CO_2$TEA Laser with High Peak Power Output": J. Phys. L. Sci. Instrum. vol. II, 1978, Stark et al.

"Pulsed Discharge $N_2SF_6$ Laser with CW Radiation as a Preionizing Source", J. Appl. Phys. 51(7), Jul. 1980, Ari et al.

"A Semiconductor Preionizer for Transversely Excited Atmospheric $CO_2$ Lasers", J. Appl. Phys. 53(4), Apr. 1982, Rickwood.

Primary Examiner—James W. Davie
Attorney, Agent, or Firm—Perman & Green

[57] ABSTRACT

To eliminate a parasitic optical pulse and achieve other advantages a TEA $CO_2$ gas laser (10) has a main discharge compartment (14) which includes a pair of oppositely disposed electrodes (16,18) which define an electrical discharge region therebetween. The main discharge compartment contains a lasant gas mixture comprised of $CO_2$/He, the lasant gas mixture being substantially devoid of $N_2$. Disposed on opposite sides of the main discharge compartment are preionization compartments (30,32) which contain a $N_2$/He gas mixture. Partitions (48,50) separate the preionization compartments from the main discharge compartment, the partitions being transparent to electromagnetic radiation having wavelengths of approximately 0.1 to 0.2 micrometers. The preionization compartments further include preionizer devices (34,36) which are electrically coupled to the electrodes and to a pulsed high voltage power supply. The preionizers ionize the $N_2$ gas which emits radiation which is coupled through the partitions and which is absorbed by the $CO_2$ gas, thereby photoionizing the $CO_2$. The partitions physically isolate the $N_2$ gas from the $CO_2$ gas.

20 Claims, 2 Drawing Sheets

$CO_2$ TEA LASER HAVING ISOLATED PREIONIZATION COMPARTMENTS

FIELD OF THE INVENTION

This invention relates generally to gas lasers and, in particular, to a $CO_2$ TEA laser having internal compartments for isolating a lasant gas mixture from a preionization gas mixture, the compartment walls comprising material which is substantially transparent to UV preionizing radiation.

BACKGROUND OF THE INVENTION

A gas mixture of a $CO_2$ Transverse Electric Atmospheric (TEA) laser typically comprises a mixture of $CO_2/He/N_2$. As a result an optical pulse output includes a desired large main pulse and an undesirable parasitic tail pulse which follows the main pulse. The optical energy of the main pulse primarily results from $CO_2$-electron collisions while the energy of the parasitic tail pulse results from excited nitrogen molecules which repump the $CO_2$ molecules in the ground state. The He gas functions as an inert carrier and as such does not contribute in any appreciable manner to the optical energy output. The $N_2$ gas functions as a preionization, or pulse conditioning, means by providing ultraviolet (UV) radiation to $CO_2$ molecules within an electrical discharge region located between a pair of high voltage electrodes.

In order to function as a source of UV radiation the $N_2$ gas is typically excited by a spark gap, semiconductor preionizer or some other suitable means. The $N_2$ photoionizes the $CO_2$ gas by supplying UV photons which are absorbed by the $CO_2$. The $CO_2$ thereafter emits electrons, thereby ionizing the main discharge region. However, due to the presence of $N_2$ within the discharge region, the aforementioned $N_2$-$CO_2$ ground state pumping effect also occurs resulting in the generation of the parasitic tail pulse.

For some applications, such as a laser range designator, the presence of the parasitic tail pulse not only decreases the power of the main pulse but may also mask returns from relatively nearby targets. Thus, the strong suppression or the total elimination of the parasitic pulse is a desirable goal in such applications.

Previously known methods of reducing the parasitic tail pulse include providing a Q-switch or removing the $N_2$ altogether from the laser. The installation of a Q-switch is disadvantageous in that it adds additional cost and complexity to the laser. The removal of $N_2$ from the laser is also disadvantageous in that the UV radiation supplied by the $N_2$ is an important element of the preionization.

SUMMARY OF THE INVENTION

The foregoing problems are overcome and other advantages are realized by a TEA $CO_2$ laser which is provided with at least two sealed compartments, one compartment containing a $CO_2/He$ lasant gas mixture which is substantially devoid of $N_2$ and another compartment containing a photoionization gas mixture. The compartments are disposed substantially adjacent to one another and are separated by a partition or window which is substantially transparent to UV radiation within the desired photoionization wavelengths.

In accordance with one aspect of the invention a TEA $CO_2$ gas laser includes a lasant gas discharge region disposed between a pair of substantially parallel and spaced apart elongated main discharge electrodes. The discharge region includes a lasant gas mixture comprised of $CO_2$ and He which is substantially devoid of $N_2$. The discharge region is further interposed between a pair of substantially parallel and spaced apart partitions, the partitions being disposed substantially perpendicularly to the electrodes. Each of the partitions separates the discharge region from an associated compartment containing $N_2$ gas and a device for ionizing the $N_2$ gas to emit electromagnetic radiation. The partitions are comprised of material which is substantially transparent to the electromagnetic radiation such that the electromagnetic radiation is admitted into the discharge region for photoionizing the $CO_2$ gas therein.

In an illustrative embodiment of the invention a main discharge compartment includes a pair of oppositely disposed electrodes which define an electrical discharge region therebetween. The main discharge compartment contains a lasant gas mixture comprised of $CO_2/He$ which is substantially devoid of $N_2$. Disposed on opposite sides of the main discharge compartment are preionization compartments which contain an $N_2/He$ gas mixture. Partitions separate the preionization compartments from the main discharge compartment and comprise windows which are transparent to UV radiation having wavelengths of approximately 0.1 to approximately 0.2 micrometers. The preionization compartments further include semiconductor type preionizers which are electrically coupled to the main electrodes and to a pulsed high voltage power supply.

The invention provides separate compartments within a TEA gas laser for separating the $CO_2$ lasant gas from the $N_2$ preionization gas, thereby eliminating the parasitic tail pulse which is generated by the excited $N_2$ molecules repumping the $CO_2$ molecules. The invention further provides for the compositions of the gas mixtures of the preionization compartments and the main discharge compartment to be separately optimized. Furthermore, for those TEA lasers which include catalytic material for recombining CO and $O_2$ into $CO_2$ the absence of $N_2$ within the main discharge compartment provides that all available recombination sites on the catalyst are available for $CO_2$ recombination. Also, by removing the $N_2$ from the main discharge compartment the $N_2$ is isolated from oxygen atoms which result from the disassociated $CO_2$. Thus, the formation of $NO_x$ species is prevented thereby making all of the disassociated $O_2$ available for $CO_2$-$O_2$ recombination. Furthermore, in that $NO_x$, in sufficient quantities, is detrimental to laser performance an increase in laser lifetime and operational stability is realized.

BRIEF DESCRIPTION OF THE DRAWING

The foregoing and other aspects of the invention will be made more apparent in the following Detailed Description of the Invention when read in conjunction with the Drawing, wherein:

FIG. 4a is a representative depiction of an optical pulse from a conventional TEA laser having a parasitic tail pulse while

DETAILED DESCRIPTION OF THE INVENTION

The following description of the invention will be made in the context of a sealed TEA $CO_2$ gas laser resonator which operates at approximately one atmosphere of lasant gas pressure. It should be realized however that the invention is equally applicable to flowing gas TEA lasers and to TEA lasers which operate at other than one atmosphere of pressure. The invention is also applicable to TEA lasers which operate as amplifiers for amplifying electromagnetic radiation from another source.

Figure 1:
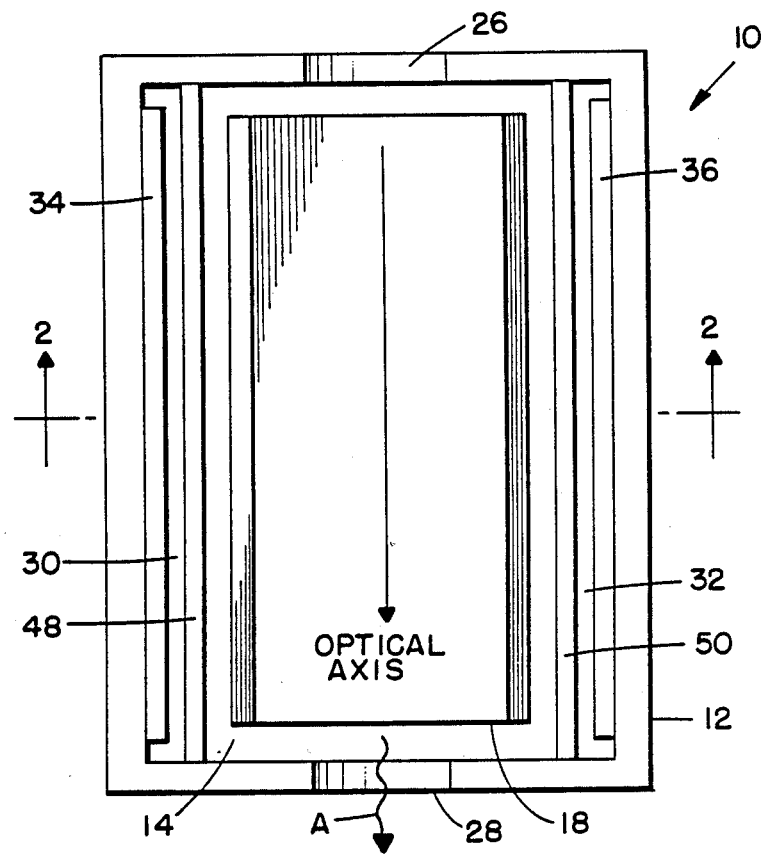
FIG. 1 is a top cross-sectional view, not to scale, of a TEA $CO_2$ gas laser having one embodiment of the invention wherein a main discharge compartment is disposed between a pair of photoionization compartments.
Figure 2:
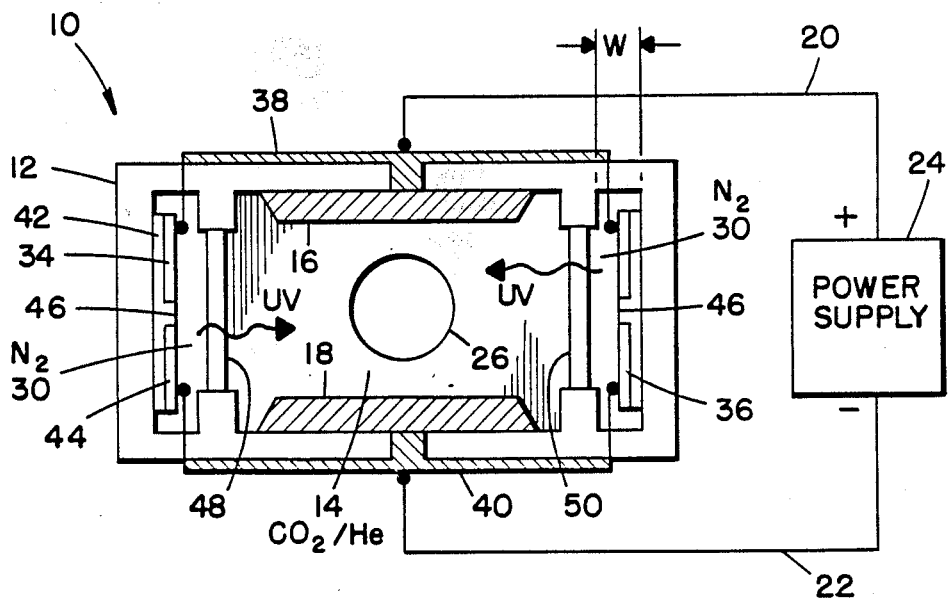
FIG. 2 is a cross-sectional view of the TEA laser of FIG. 1 taken along the section line 2—2.

Referring now to FIGS. 1 and 2 there are shown two views of a TEA gas laser 10 constructed and operated in accordance with invention. Laser 10 comprises a housing 12 which includes separate chambers or compartments. These compartments include a main discharge compartment 14 having a pair of high voltage discharge electrodes 16 and 18 disposed therein. Electrodes 16 and 18 may have any suitable profile and are coupled via leads 20 and 22, respectively, to a high voltage power supply 24. Power supply 24 is preferably a pulsed output power supply which may have a 22 KV discharge potential having a pulse width of approximately 100–150 nanoseconds. Compartment 14 contains a lasant gas mixture which comprises $CO_2$/He. The gas pressure within compartment 14 may be in the range of 1.0 to 1.2 atmospheres although in some lasers constructed in accordance with the invention the pressure may be several atmospheres. An electrical pulse generated by power supply 24 and coupled to the electrodes 16 and 18 induces the $CO_2$ gas disposed therebetween to emit electromagnetic radiation having a characteristic wavelength. Disposed on opposite ends of compartment 14 are a totally reflecting mirror 26 and a partially reflecting/partially transmitting mirror 28. Mirrors 26 and 28 define therebetween an optical axis of a resonant cavity structure from which a coherent pulse of optical radiation, indicated by the letter A, is emitted from the laser 10. In that the lasant gas mixture comprises $CO_2$ this pulse of optical radiation has a characteristic wavelength of 10.6 micrometers.

In accordance with one embodiment of the invention the laser 10 further comprises a first photoionization compartment 30 and a second photoionization compartment 32. Compartments 30 and 32 are disposed on opposite sides of main discharge compartment 14 and are substantially parallel to a longitudinal axis of compartment 14. Compartments 30 and 32 contain $N_2$ gas and also, typically, He. Compartments 30 and 32 also each contain a preionization device such as a semiconductor preionizer 34 and 36, respectively. Such semiconductor preionizers are known in the art and typically comprise two bodies of silicon carbide 42 and 44 which are separated by a relatively thin ceramic body 46. Due to the inherent current limiting characteristic of silicon carbide undesirable arcing across the ceramic body 46 is suppressed. It should be realized that in other embodiments of the invention that the preionization devices may comprise electrical arc generating means such as trigger wires or spark boards. In general, a preionization device may be any suitable means which is operable for inducing the $N_2$ gas within the compartment to emit photoionizing radiation.

In the embodiment of FIG. 1 and FIG. 2 preionization devices 34 and 36 are each electrically coupled to the main electrodes 16 and 18 by electrical conductors 38 and 40. When the power supply 24 applies a pulsed potential to electrodes 16 and 18 the preionizers 34 and 36 are simultaneously energized and induce the $N_2$ gas within the photoionization compartments 30 and 32 to emit UV radiation. In other embodiments of the invention the preionization devices may be coupled to a separate power supply the operation of which is synchronized with the operation of power supply 24.

Main discharge compartment 14 is separated from compartments 30 and 32 by means of partitions 48 and 50 which form a gas-tight seal between the compartments to prevent the entry of $N_2$ into the main discharge compartment. Partitions 48 and 50 are comprised of a material which is substantially transparent to the UV radiation emitted by the $N_2$ gas within the compartments 30 and 32. For example, the UV radiation may have wavelengths of approximately 0.1 to approximately 0.2 micrometers. Partitions 48 and 50, by example, may comprise LiF or $MgF_2$ both of which materials are suitable for transmitting radiation having wavelengths within this region.

In accordance with the invention the UV radiation generated within photoionization compartments 30 and 32 is coupled into the main discharge compartment 14 through the substantially transparent partitions 48 and 50. The UV radiation is absorbed by and ionizes the $CO_2$ gas within compartment 14. This has the beneficial effect of reducing the electrical breakdown potential of the $CO_2$ gas. After several nanoseconds the electrical potential across the electrodes 16 and 18 discharges through the $CO_2$, resulting in a pulse of coherent radiation to be emitted by the laser 10. The UV photoionization photons also improve the spatial uniformity of the main discharge and suppress arcing between the electrodes 16 and 18.

Typical dimensions for the laser 10 shown in FIGS. 1 and 2 are as follows. Electrodes 16 and 18 may each have a width of approximately 2 centimeters and a length of approximately 10 centimeters. The spacing between the electrodes 16 and 18 is approximately 1 centimeter. The total lasant gas volume within the main discharge compartment 14 may be approximately 65 ml. The width (W) of the preionization chambers 30 and 32 is approximately one centimeter. Typically the gas mixture within the preionization chambers 30 and 32 also comprises He which, at relatively high repetition rates, tends to improve the thermal conductivity of the photoionization gas mixture. Preferably the compartments 30 and 32 run parallel to the electrodes 16 and 18 for approximately the entire length of the electrodes in order to preionize substantially the entire discharge region.

Figure 3:
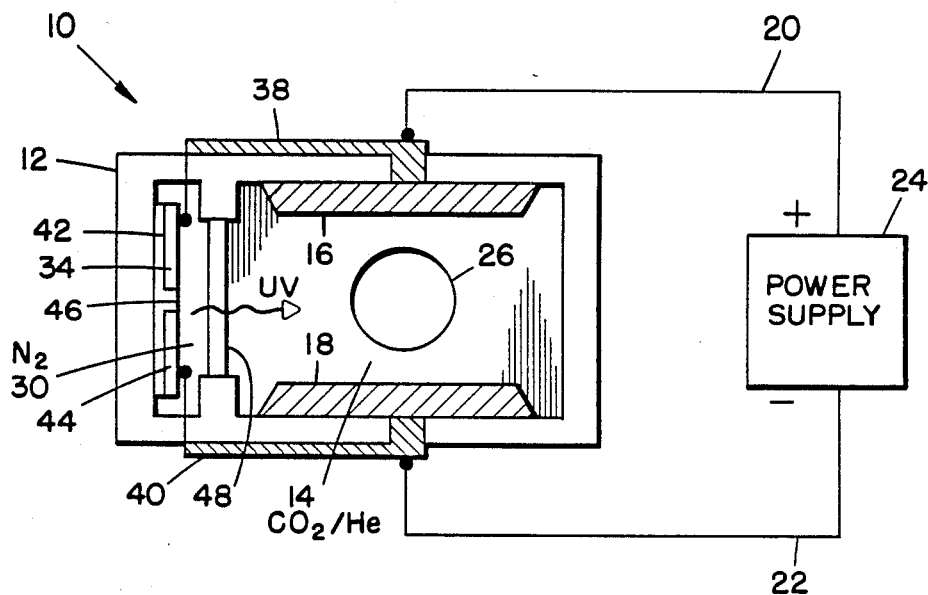
FIG. 3 is a cross-sectional view, similar to the view of FIG. 2, showing another embodiment of the invention wherein a main discharge compartment has one photoionization compartment disposed in substantially parallel arrangement therewith.

It should be realized that the benefits of the invention may be realized by providing one photoionization compartment 30 on one side of the main discharge compartment instead of the two illustrated in FIGS. 1 and 2. Such a configuration is shown in FIG. 3. However, it has been found that providing photoionization chambers or compartments which are symmetrically disposed about the discharge region, as illustrated in FIGS. 1 and 2, improves the overall mode quality of the laser in that the photoionization occurs uniformly throughout the discharge region. This results in an improvement in the laser spatial mode pattern.

Figure 4A:
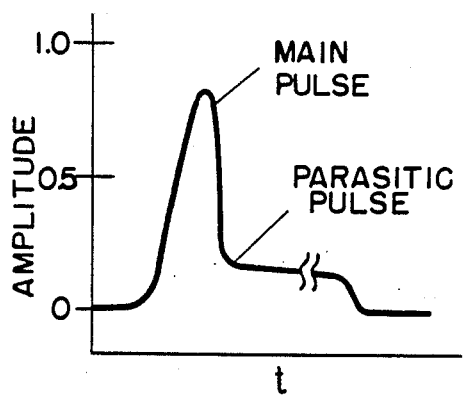
Figure 4B:
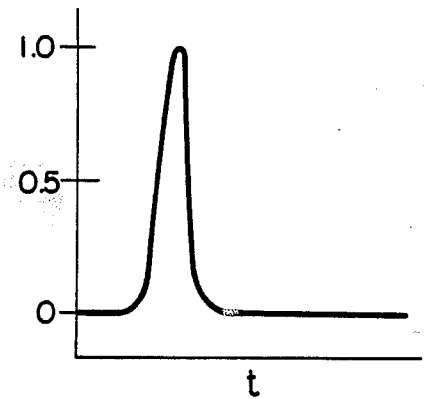
FIG. 4b is a representative optical pulse waveform of a laser constructed and operated in accordance with the invention.

It should be appreciated that the use of the invention provides a number of advantages in the operation of a TEA $CO_2$ laser. In that the $N_2$ is physically isolated from the $CO_2$, the formation of a parasitic optical tail pulse is eliminated, thereby enhancing the optical power of the main pulse. As shown in FIG. 4a, in a conventional $CO_2$ TEA laser this parasitic pulse continues for a substantial amount of time after the main discharge pulse and correspondingly reduces the power of the main discharge pulse. However, as shown in FIG. 4b, by eliminating this parasitic tail pulse the power of the main pulse is enhanced. A second advantage which is realized by the use of the invention is that the composition of the lasant gas mixture may be optimized separately from the composition of the preionization gas mixture. That is, an increased $N_2$ concentration may be employed in the preionization compartments 30 and 32 while maintaining the main discharge gas mixture at some desired concentration of $CO_2$. By example, a laser constructed in accordance with the invention has a laser gas medium comprised of approximately 23% $CO_2$/77% He at one atmosphere while the preionization gas is comprised of approximately 100% $N_2$ at two atmospheres. This results in improved preionization by supplying proportionately more UV photons for $CO_2$ photoionization which further results in an improved glow discharge and improved laser output performance. Still another advantage which accrues from the use of the invention is especially apparent in those types of lasers which employ a catalyst within or in communication with the main discharge region, the catalyst providing for the recombination of CO and $O_2$ into $CO_2$ In that no catalyst recombination sites are occupied by $N_2$ or nitrogen compounds the entire catalytic surface is made available for $CO_2$ recombination. Furthermore, by isolating the $N_2$ from the $CO_2$, disassociated oxygen atoms cannot combine with nitrogen to produce undesirable $NO_x$ molecular species.

It is within the scope of the invention to provide the main discharge compartment with seed gases or gases, such as CO, which facilitates the rapid recombination of CO and $O_2$.

An important aspect of the invention is that the lasant gas is substantially devoid of $N_2$. In that the power of the parasitic tail pulse has been found to vary approximately exponentially with the concentration of $N_2$ within the main discharge compartment, a concentration of $N_2$ which is less than approximately one percent has been found to provide satisfactory operation. That is, a total $N_2$ concentration which is less than approximately one percent of the total lasant gas volume within the main discharge compartment has been found to substantially eliminate the parasitic optical tail pulse.

As was previously stated what has been described are illustrative embodiments of the invention and, as such, the invention should not be construed to be limited to only that disclosed above. In that those having skill in the art may derive a number of modifications to the invention based upon this disclosure it is intended that the invention be limited only as defined by the appended claims.

What is claimed is:

1. A $CO_2$ gas laser comprising:
   means for defining a resonant cavity structure, said resonant cavity structure including a volume of lasant gas comprised of $CO_2$, said lasant gas being substantially devoid of $N_2$;
   means for generating an electrical discharge within said resonant cavity structure for ionizing said lasant gas such that said lasant gas emits electromagnetic radiation; and
   means for preionizing said lasant gas with ultraviolet radiation, said preionizing means comprising chamber means containing a preionizing gas comprised of $N_2$, said chamber means comprising means for ionizing said $N_2$ gas such that said $N_2$ gas emits ultraviolet radiation, and wherein
   said chamber means is separated from said resonant cavity structure by partition means, said partition means being comprised of a material which is substantially transparent to ultraviolet radiation for coupling ultraviolet radiation emitted by said $N_2$ gas to said lasant gas.

2. A $CO_2$ gas laser as set forth in claim 1 wherein said chamber means comprises a first compartment disposed substantially adjacent to said resonant cavity structure and separated therefrom by a first partition, said chamber means further comprising a second compartment disposed substantially adjacent to said resonant cavity structure and separated therefrom by a second partition, said first and said second compartments each containing $N_2$ gas and means for ionizing said $N_2$ gas, said first and said second partitions each being comprised of material which is transparent to ultraviolet radiation.

3. A $CO_2$ gas laser as set forth in claim 2 wherein said means for generating an electrical discharge comprises a first elongated electrode and a second elongated electrode disposed in a parallel spaced apart manner one from the other and defining a discharge region therebetween, said discharge region being disposed between said first and said second compartments, said first and said second compartments having a length substantially equal to a length of said discharge region.

4. A $CO_2$ gas laser as set forth in claim 3 wherein said first and said second electrodes and said means for ionizing are coupled to a pulsed source of electrical potential and are energized substantially simultaneously thereby.

5. A $CO_2$ gas laser as set forth in claim 1 wherein said lasant gas is comprised of less than approximately one percent of $N_2$.

6. A TEA $CO_2$ gas laser comprising:
   a housing, said housing comprising a first chamber which includes
   a first elongated electrode and a second elongated electrode disposed substantially parallel to one another in a spaced apart manner for defining a discharge region therebetween;
   a lasant gas mixture within said discharge region, said lasant gas mixture comprising $CO_2$, said lasant gas mixture being substantially devoid of $N_2$; and wherein
   said housing further comprises
   a second chamber disposed substantially adjacent to said first chamber and separated therefrom by a first partition, said second chamber being disposed substantially parallel to said discharge region, said second chamber containing $N_2$ gas and means for ionizing said $N_2$ gas such that said $N_2$ gas emits electromagnetic radiation within a predetermined range of wavelengths, and wherein
   said first partition is comprised of material which is substantially transparent to said radiation for coupling said radiation from said second chamber to said first chamber.

7. A TEA $CO_2$ gas laser as set forth in claim 6 wherein said housing further comprises:

a third chamber disposed substantially adjacent to said first chamber and separated therefrom by a second partition, said third chamber being disposed substantially parallel to said discharge region, said third chamber containing $N_2$ gas and means for ionizing said $N_2$ gas such that said $N_2$ gas emits electromagnetic radiation within the predetermined range of wavelengths, and wherein said second partition is comprised of material which is substantially transparent to said radiation for coupling said radiation from said third chamber to said first chamber.

8. A TEA $CO_2$ gas laser as set forth in claim 7 wherein said second and said third chambers are disposed in a substantially symmetrical manner about said first chamber, said first chamber being interposed between said second and said third chambers.

9. A TEA $CO_2$ gas laser as set forth in claim 8 wherein said radiation is within a range of wavelengths of approximately 0.1 to approximately 0.2 micrometers.

10. A TEA $CO_2$ gas laser as set forth in claim 9 wherein said first and said second partitions comprise LiF, $MgF_2$ or combinations thereof.

11. A TEA $CO_2$ gas laser as set forth in claim 8 wherein said means for ionizing said $N_2$ gas comprises a semiconductor preionizer.

12. A TEA $CO_2$ gas laser as set forth in claim 8 wherein said means for ionizing said $N_2$ gas comprises means operable for generating an electrical arc.

13. A TEA $CO_2$ gas laser as set forth in claim 8 wherein said means for ionizing said $N_2$ gas and said first and said second electrodes are each electrically coupled to a pulsed, high voltage power supply.

14. A TEA $CO_2$ gas laser as set forth in claim 7 wherein said lasant gas mixture is comprised of less than approximately one percent $N_2$.

15. A TEA $CO_2$ gas laser for generating a pulse of optical radiation, the laser comprising a laser gas discharge region disposed between a pair of substantially parallel and spaced apart elongated main discharge electrodes, the discharge region including a laser gas mixture comprised of $CO_2$ and He, the laser gas mixture being substantially devoid of $N_2$, the discharge region further being disposed between a pair of substantially parallel and spaced apart partitions, the partitions being disposed substantially perpendicularly to the electrodes, each of the partitions separating the discharge region from an associated compartment containing $N_2$ gas and a means for ionizing the $N_2$ gas to emit electromagnetic radiation, the partitions being comprised of material which is substantially transparent to the electromagnetic radiation for admitting the electromagnetic radiation into the discharge region for photoionizing the $CO_2$ gas therein.

16. A TEA $CO_2$ gas laser as set forth in claim 15 wherein the electromagnetic radiation is within a range of wavelengths of approximately 0.1 to approximately 0.2 micrometers.

17. A TEA $CO_2$ gas laser as set forth in claim 16 wherein the partitions comprise LiF, $MgF_2$ or combinations thereof.

18. A TEA $CO_2$ gas laser as set forth in claim 15 wherein the laser gas mixture contains a maximum concentration of $N_2$ which is less than a minimum $N_2$ concentration which would induce the generation of a parasitic optical pulse in conjunction with the generation of a main pulse of optical radiation.

19. A TEA $CO_2$ gas laser as set forth in claim 18 wherein the maximum concentration of $N_2$ is approximately one percent.

20. A TEA $CO_2$ gas laser as set forth in claim 15 wherein said laser gas mixture is comprised of approximately 23% $CO_2$ and approximately 77% He and wherein each of the compartments contains approximately 100% $N_2$.

* * * * *